United States Patent [19]

Takaki

[11] Patent Number: 5,127,088
[45] Date of Patent: Jun. 30, 1992

[54] DISK CONTROL APPARATUS

[75] Inventor: Toshiaki Takaki, Tokyo, Japan

[73] Assignee: NEC Corporation, Tokyo, Japan

[21] Appl. No.: 372,740

[22] Filed: Jun. 28, 1989

[30] Foreign Application Priority Data

Jun. 28, 1988 [JP] Japan .................................. 63-157934

[51] Int. Cl.⁵ ............................................. G06F 13/10
[52] U.S. Cl. ............................. 395/275; 364/DIG. 1;
364/236.2; 364/248.1; 364/239.8; 364/259.2;
364/238.4
[58] Field of Search ... 364/200 MS File, 900 MS File;
395/250, 275

[56] References Cited

U.S. PATENT DOCUMENTS

| | | | |
|---|---|---|---|
| 4,091,455 | 5/1978 | Woods et al. | 364/200 |
| 4,148,098 | 4/1979 | McCreight et al. | 364/200 |
| 4,280,193 | 7/1981 | Baun et al. | 364/900 |
| 4,574,346 | 3/1986 | Hartung | 364/200 |
| 4,612,613 | 9/1986 | Gershenson et al. | 364/200 |

*Primary Examiner*—Thomas M. Heckler
*Attorney, Agent, or Firm*—Sughrue, Mion, Zinn, Macpeak & Seas

[57] ABSTRACT

A disk control apparatus for performing parallel data transfer between a host processor and N number of disk devices. The disk control apparatus includes N number of disk control units for controlling writing and reading of data into and from the disk devices, N number of buffer control units, each having a data buffer for storing data to be written into the disk device and data read from the disk device, and a main control unit for controlling the parallel data transfer between the host processor and the N number of buffer control units. The disk control apparatus further includes a sequential number generating unit and a check code generating unit for applying a sequential number and a check code to data to thereby write the data into the disk devices, and a comparator unit operative when transferring data stored in the data buffers which is read from the disk devices through the disk control unit for comparing sequential number and check code read from the data buffers with the sequential number and check code generated from the sequential number generating unit and check code generating unit.

3 Claims, 9 Drawing Sheets

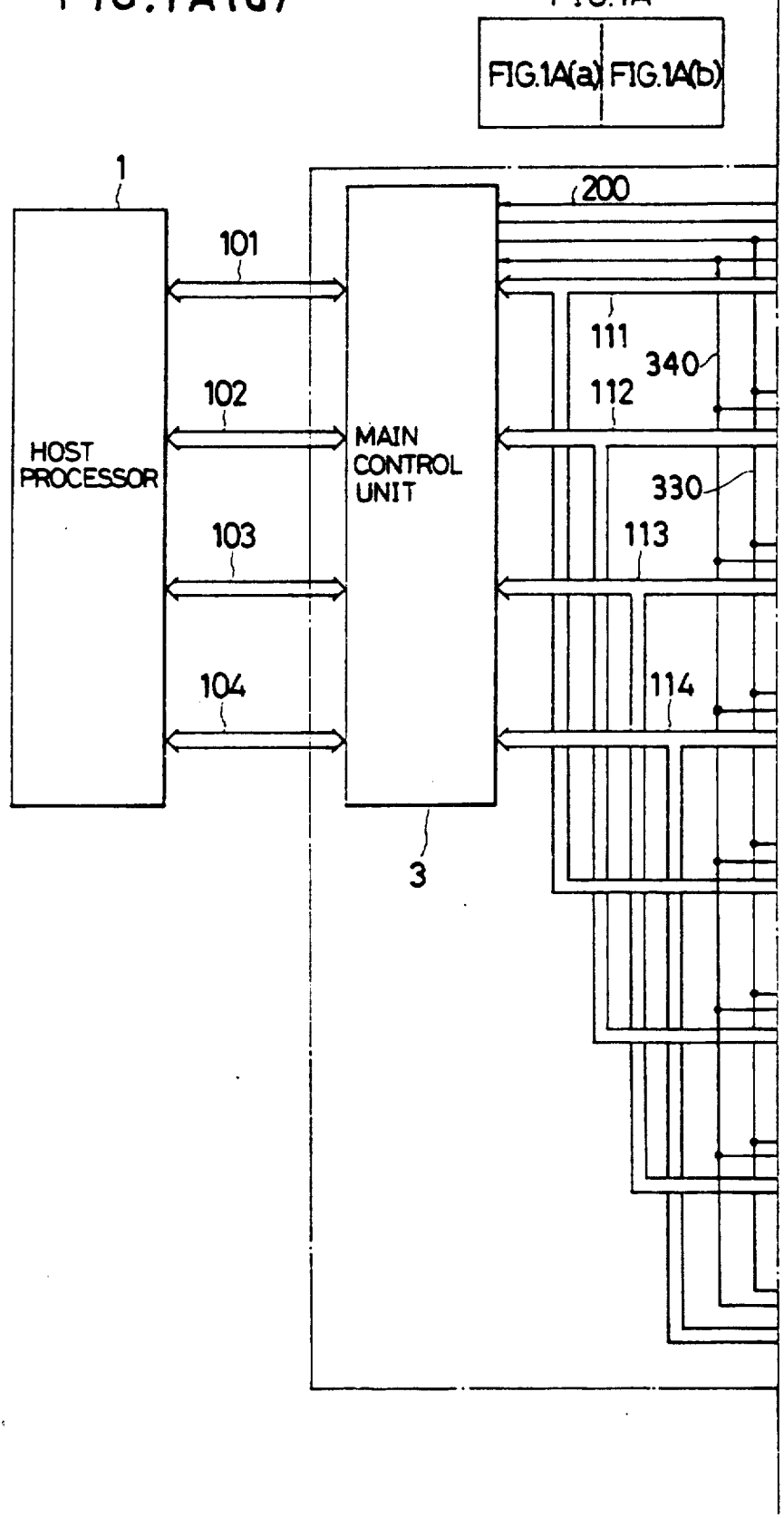

(HOST PROCESSOR 1)

| DATA WORD | 1 | 2 | 3 | 4 | | 1021 | 1022 | 1023 | 1024 |
|---|---|---|---|---|---|---|---|---|---|
| (101) | 1-1 | 2-1 | 3-1 | 4-1 | | 1021-1 | 1022-1 | 1023-1 | 1024-1 |
| (102) | 1-2 | 2-2 | 3-2 | 4-2 | | 1021-2 | 1022-2 | 1023-2 | 1024-2 |
| (103) | 1-3 | 2-3 | 3-3 | 4-3 | | 1021-3 | 1022-3 | 1023-3 | 1024-3 |
| (104) | 1-4 | 2-4 | 3-4 | 4-4 | | 1021-4 | 1022-4 | 1023-4 | 1024-4 |

DISK CONTROL APPARATUS

BACKGROUND OF THE INVENTION

The present invention relates to disk control apparatus, and more specifically relates to disk control apparatus operative to transfer in parallel data read from a plurality of disk devices through a plurality of data buffers to a host processor.

The conventional disk control apparatus of this type operates when reading data from disk device to check whether sector is designated one or not by means of sector ID, and thereafter effects the reading of data and stores them to a data buffer. However, when the data read from the data buffer is transferred to the host processor, main control device does not check whether the data is designated one or not.

The above described conventional disk control apparatus operates to divide information into parts and to record them into a plurality of disk devices. When reproducing, the apparatus does not check whether reproduced data constitutes the same information together with other reproduced data reproduced from other disk devices. Therefore, when one of the disk device outputs wrong data due to some cause, the host processor cannot recognize the error and retrieves the wrong data to thereby cause serious problem.

SUMMARY OF THE INVENTION

In order to solve such problem of the prior art, an object of the present invention is to provide disk control apparatus operative to prevent the transfer of wrong data when transferring data read from a data buffer to the host computer.

The present invention provides, in a disk control apparatus for carrying out parallel data transfer between a host processor and N number of disk devices, having N number of disk control units for controlling writing and reading of data into and from said disk devices, N number of buffer control units, each having a data buffer for storing data to be written into said disk device and data read from said disk device, and a main control unit for controlling the parallel data transfer between said host processor and said N number of buffer control units, the disk control apparatus being characterized by: writing means including a sequential number generating unit and a check code generating unit for applying a sequential number and a check code to data to thereby write the data into said disk devices; and comparing means operative when transferring data stored in the data buffers which is read from the disk devices through the disk control devices for comparing sequential number and check code read from the data buffers with the sequential number and check code generated from the sequential number generating unit and check code generating unit.

DETAILED DESCRIPTION OF EMBODIMENTS

Figure 1A:
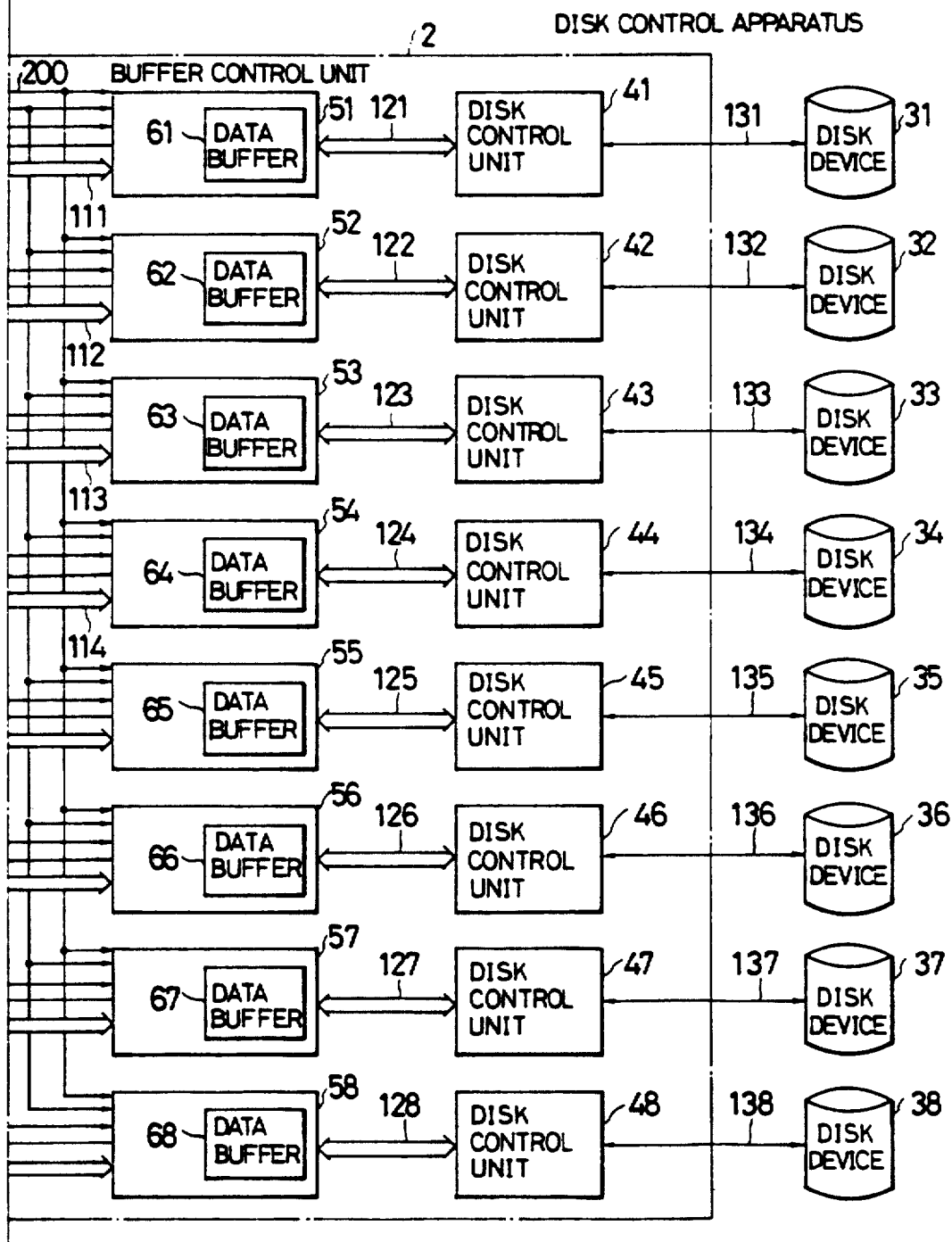
FIGS. 1A(a) and 1A(b), connected as shown in FIG. 1A, are block diagrams showing whole structure of one embodiment according to the present invention.
Figure 1B:
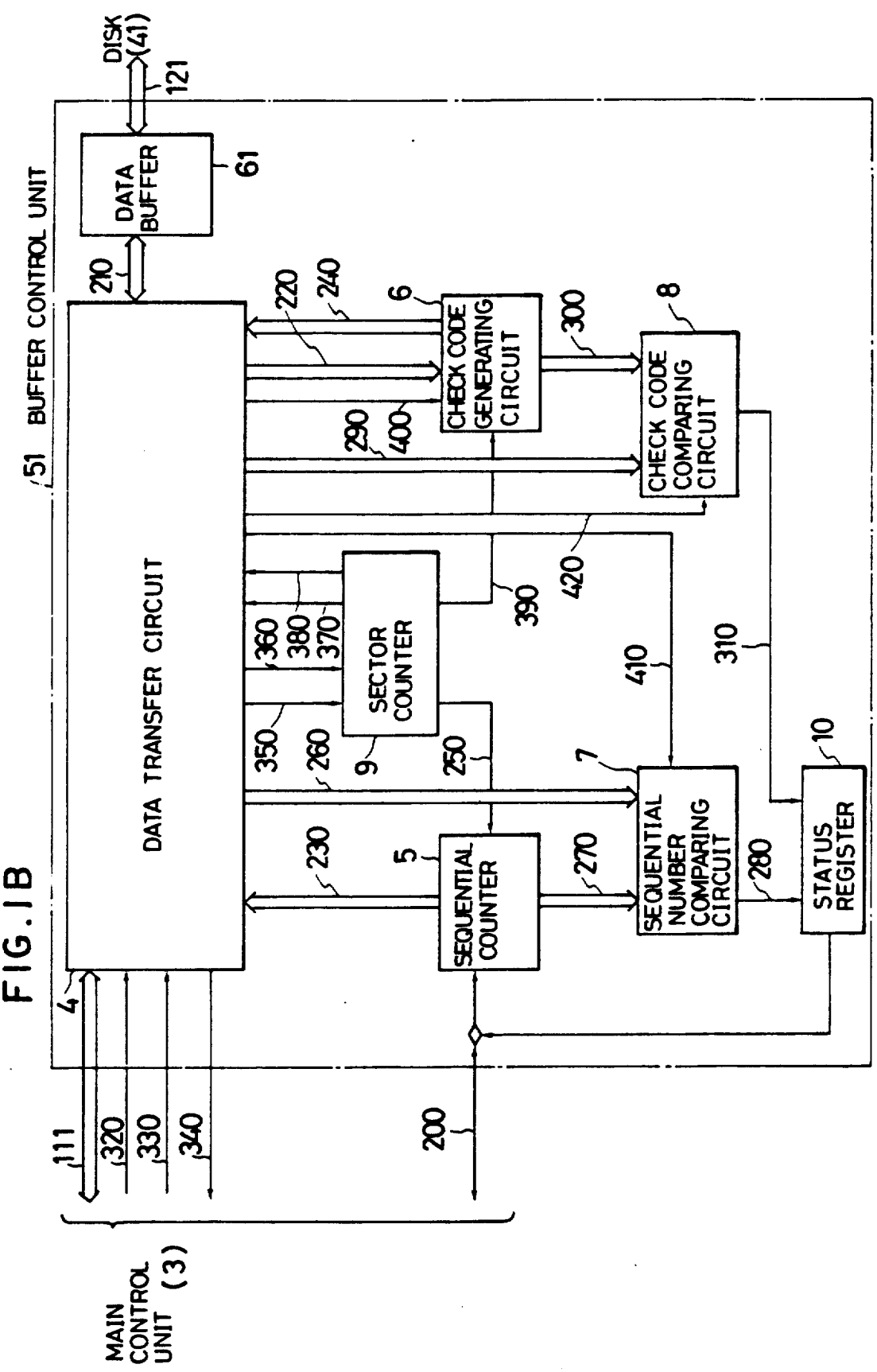
FIG. 1B is a block diagram showing a buffer control unit 51 in the FIG. 1A embodiment.

Next, the present invention is described with reference to the drawings. FIG. 1A is a block diagram the whole structure of one embodiment according to the invention, and FIG. 1B is a block diagram showing a buffer control unit 51 in the FIG. 1A embodiment. Referring to FIG. 1A, numeral 2 denotes a disk control apparatus for controlling data transfer between a host processor 1 and a plurality of disk devices 31, 32 . . . , 38 storing a plurality of files at fixed length. The disk control apparatus 2 is comprised of disk control units 41, 42, . . . , 48 for controlling the writing and reading of data to and from respective ones of the disk devices 31, 32, . . . , 38, buffer control units 51, 52, . . . , 58 for applying sequential number and check code to data transferred from the host processor 1, data buffers 61, 62 . . . , 68 disposed within respective ones of the buffer control units 51, 52, . . . , 58 for storing data applied with the sequential number and check code, and a main control unit 3 for controlling parallel data transfer between the host processor 1 and the buffer control units 51, 52, . . . , 58.

First, a description will be given for the case of writing data into the disk devices 31, 32, . . . , 38. The main control unit 3 receives data "101"–"104" transferred from the host processor 1 with 4-byte width, and outputs sequentially data "111"–"114" into the buffer control units 51–54 and into the buffer control units 55–58. The buffer control units 51, 52, . . . , 58 apply sequential number and check code to the data "111", "112", . . . , "114" output from the main control unit 3 every 512 bytes, and store the data into the data buffers 61, 62, . . . , 68. The disk control units 41, 42, . . . , 48 write the data "121", "122", . . . , "128" applied with the sequential number and check code and read from the data buffers 61, 62, . . . , 68 into data region of designated record or sector of the respective disk devices 31, 32, . . . , 38 through lines 131, 132, . . . , 138.

Figure 2A:
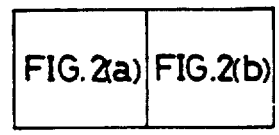
FIGS. 2(a) and 2(b), connected as shown in FIG. 2, are diagrams showing distribution of data in the embodiment.
Figure 2A:
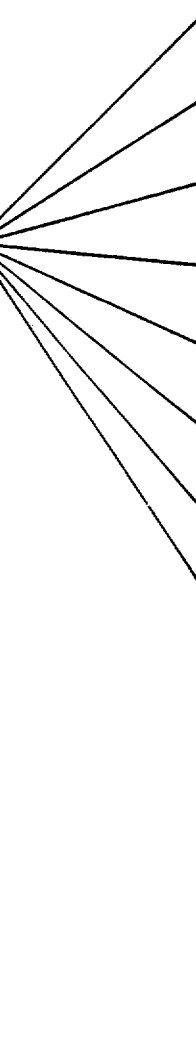
Figure 2B:
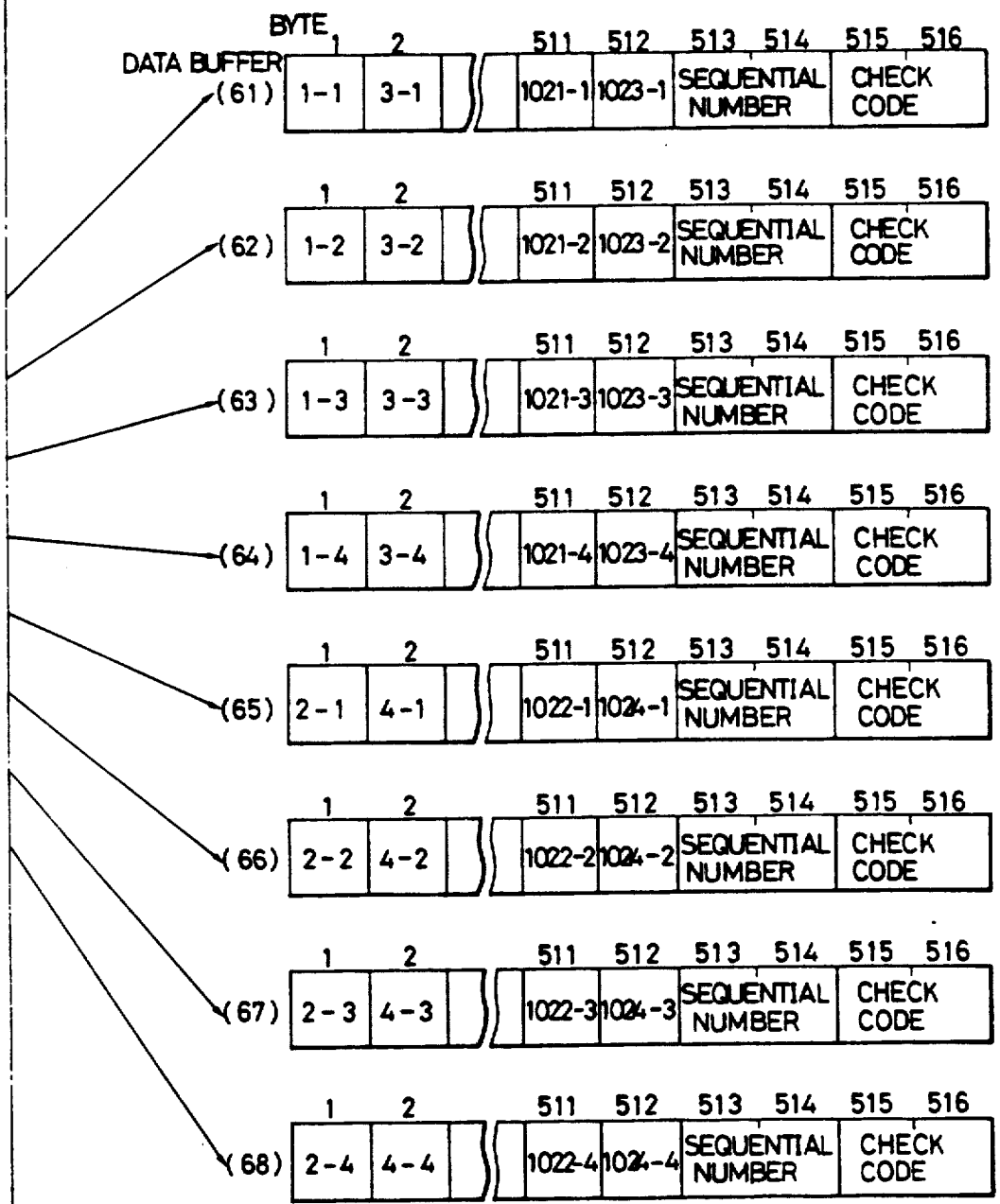

FIG. 2 is a diagram showing distribution of the data transferred from the host processor 1 through data bus 101-104 of 4-byte width to the data buffers 61-68. Data 1—1 through 1-4 are stored into the data buffers 61-64, and next data "2-1" through "2-4" are stored into the data buffers 65-68. Data of 4096 bytes (1024 words) are distributed to respective ones of the data buffers 61-68, each of which stores data of 512 bytes. Continuously, sequential number of 2 bytes and check code of 2 bytes are stored into the data buffers 61-68.

Next, the description will be given for the case of reading data from the disk devices 31, 32, . . . , 38. The disk control units 41, 42, . . . , 48 operate to read data from a region of the designated record or sector within the disk devices 31, 32, . . . , 38 each connected to the corresponding disk control unit, and operate to output the read data "121", "122", . . . , "128" applied with the sequential number and check code, respectively, into the buffer control units 51, 52, . . . , 58 and to store them into the data buffers 61, 62, . . . , 68. When transferring the data stored in the data buffers 61, 62, . . . , 68 to the host processor 1, the buffer control units 51, 52, . . . , 58 operate to read only data portion of the combination of the data and the sequential number and check code stored in the respective data buffers 61, 62, . . . , 68, and output data "111", "112", ..., "114" into the main control unit 3. The main control unit 3 receives data "111"–"114" output from the buffer control units 51–54 and 55–58, and transfers the data "101"–"104" to the host processor 1.

Next, detailed structure of the buffer control units 51–58 are described according to FIG. 1B. Since, the buffer control units 51–58 are of similar operation, the buffer control unit 51 is hereinafter explained as representative of all the above buffer control units. The buffer control unit 51 is comprised of a data transfer circuit 4 for controlling data transfer between the main control unit 3 and the data buffer 61, a sequential counter 5 for incrementing sequential number set by the main control unit 3 through bus 200 according to an increment signal 250 outputted from a sector counter 9, a check code generating circuit 6 for generating check code with respect to data of one sector and the sequential number, a sequential number comparing circuit 7 for comparing the sequential number 260 read from the data buffer 61 through the data transfer circuit 4 with the sequential number 270 outputted from the sequential counter 5, a check code comparing circuit 8 for comparing the check code 290 read from the data buffer 61 through the data transfer circuit 4 with check code 300 output from the check code generating circuit 6, the sector counter 9 for counting byte number of one sector (516 bytes), and a status register 10 for storing a sequential number non-coincident signal 280 output from the sequential number comparing circuit 7 and a check code non-coincident signal 310 outputted from the check code comparing circuit 8.

Figure 3A:
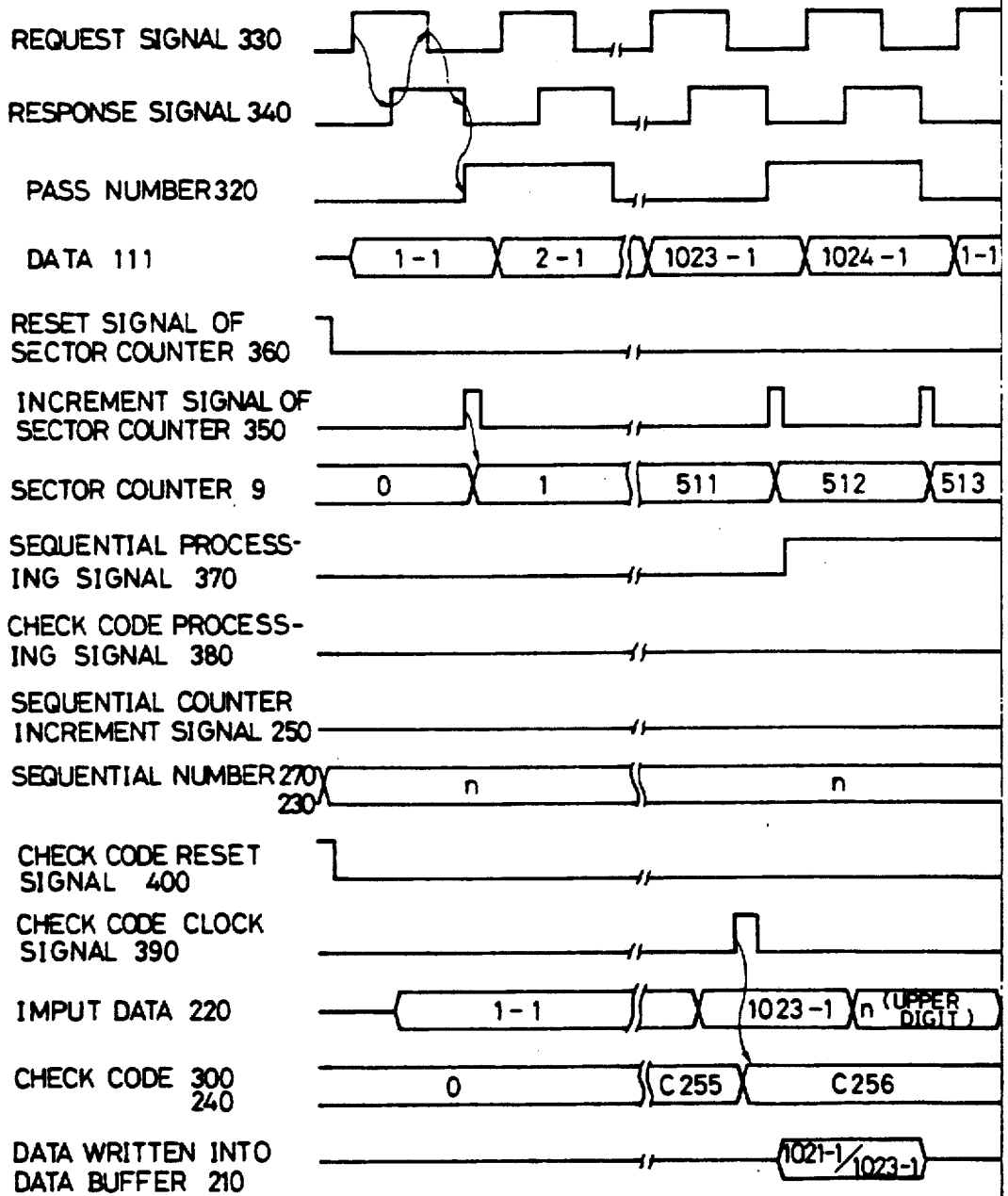
FIGS. 3(a) and 3(b), connected as shown in FIG. 3, are timing charts during data writing operation.
Figure 3B:
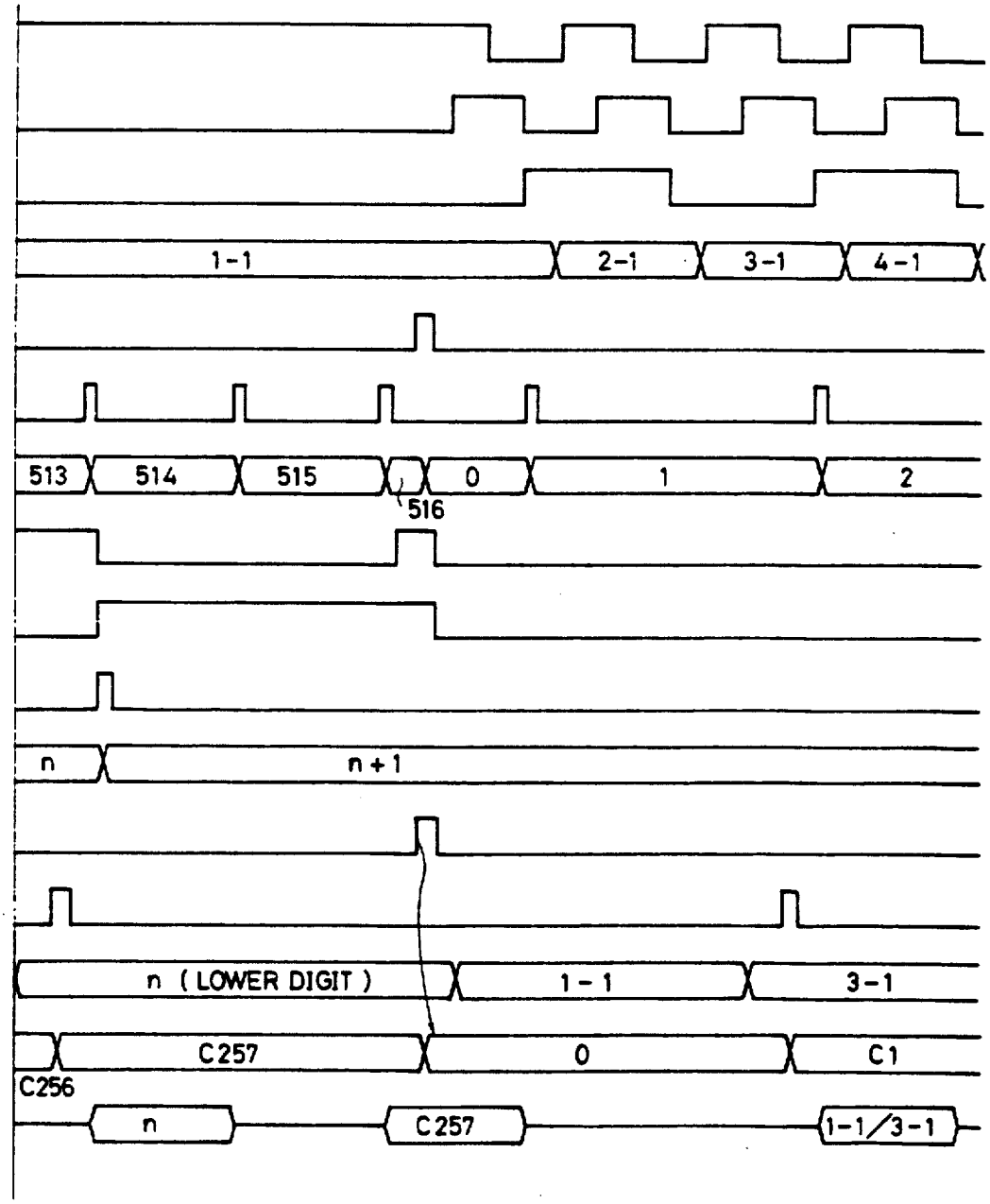

FIG. 3 shows a timing chart of signals of the buffer control unit 51 during the writing of data into the data buffer 61. First, the description is given for data transfer between the main control unit 3 and the data transfer circuit 4. The main control unit 3 outputs data 111 and pass number 320, and thereafter outputs a request signal 330. The data transfer circuit 4 operates when the request signal 330 is output to return a response signal 340 and to receive the data. At this time, when the pass number 320 is set to logic "0", the buffer control units 51–54 respond, and when the pass number 320 is set to logic "1", the buffer control units 55–58 respond. The main control unit 3 sequentially updates pass number 320 when the response signal 340 is returned from the data transfer circuit 4.

Next, the description is given for the operation of sector counter 9. The sector counter 9 is reset to 0 according to a reset signal 360 from the data transfer circuit 4, and carries out counting according to an increment signal 350 output at every occurrence of 1-byte processing of the sequential number and check code and data transfer between the data transfer circuit 4 and the main control unit 3. The sector counter 9 outputs increment signal 250 of the sequential counter 5 when the count reaches "514", and outputs a check code clock signal every two bytes of data and sequential number. Further, the sequential counter 9 operates when the count is "512", "513" and "516", respectively, to output a sequential processing signal 370, and operates when the count is 514–516 to output a check code processing signal 380. The data transfer circuit 4 operates when sequential processing signal 370 and check code processing signal 380 have logic "0" to output the data transferred from the main control unit 3, operates when sequential processing signal 370 has logic "1" and check code processing signal 380 has logic "0" to output sequential number 230 fed from the sequential counter 5, and operates when sequential processing signal 370 has logic "0" and check code processing signal 380 has logic "1" to output check code 240 fed from check code generating circuit 6. The output data, sequential number and check code are applied as written data "210" to data buffer 61. Further, data transfer circuit 4 operates when the sequential processing signal 370 and check code processing signal 380 have logic "1" to output a reset signal 360 to the sector counter 9.

The sequential counter 5 operates after sequential number "n" is set by main control unit 3 through bus 200 to increment the sequential number according to increment signal 250 output from sector counter 9.

The check code generating circuit 6 is reset according to reset signal 400 output from data transfer circuit 4, and generates a check code based on generating data "220" output from data transfer circuit 4 according to check code clock signal 390 fed from sector counter 9. During the writing of data into data buffer 61, since data transfer circuit 4 does not output sequential comparison signal 410 and check code comparison signal 420, the sequential number comparing circuit 7, check code comparing circuit 8 and status register 10 do not operate.

Figure 4A:
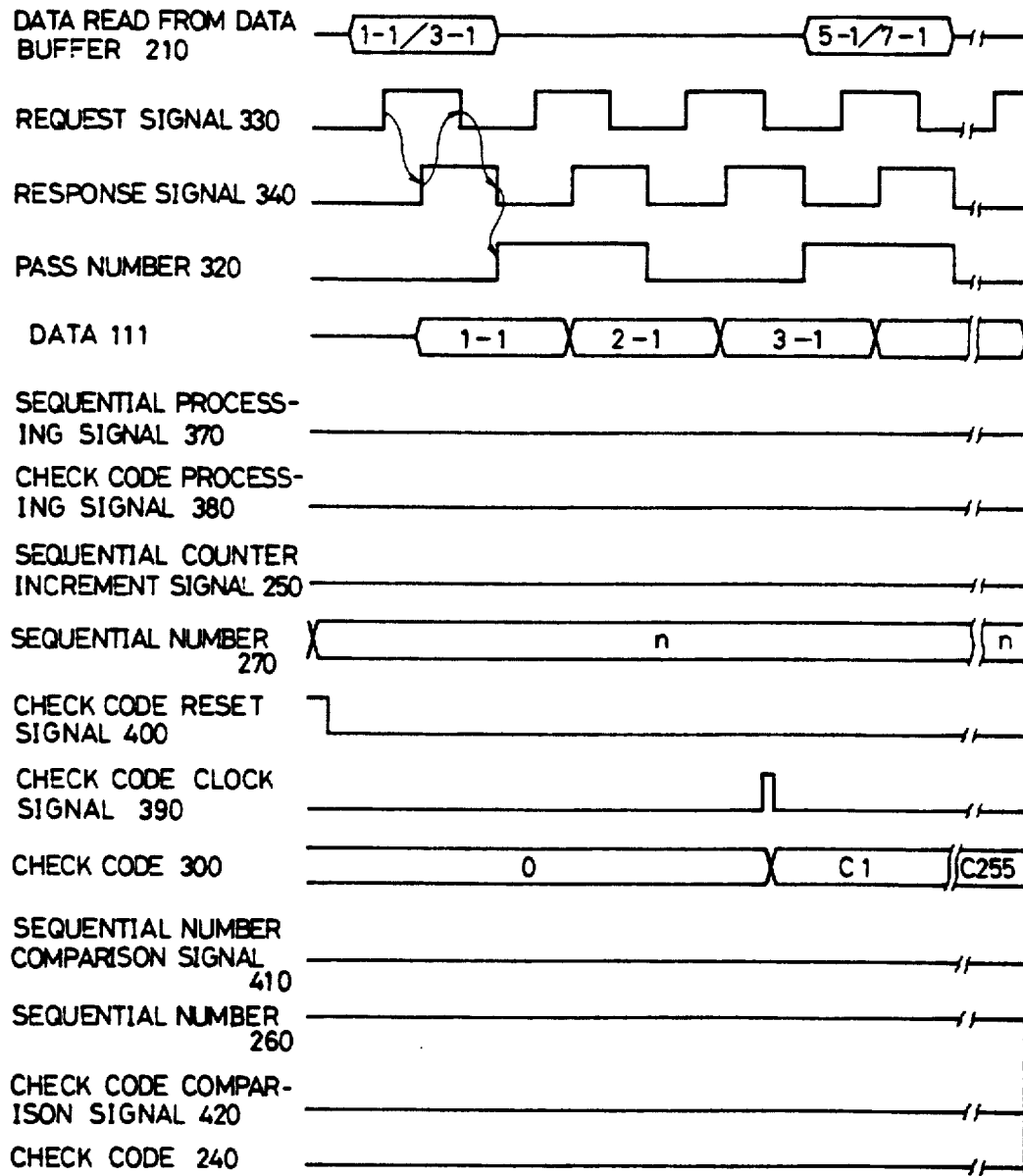
FIGS. 4(a) and 4(b), connected as shown in FIG. 4, are are timing charts during data reading operation.
Figure 4B:
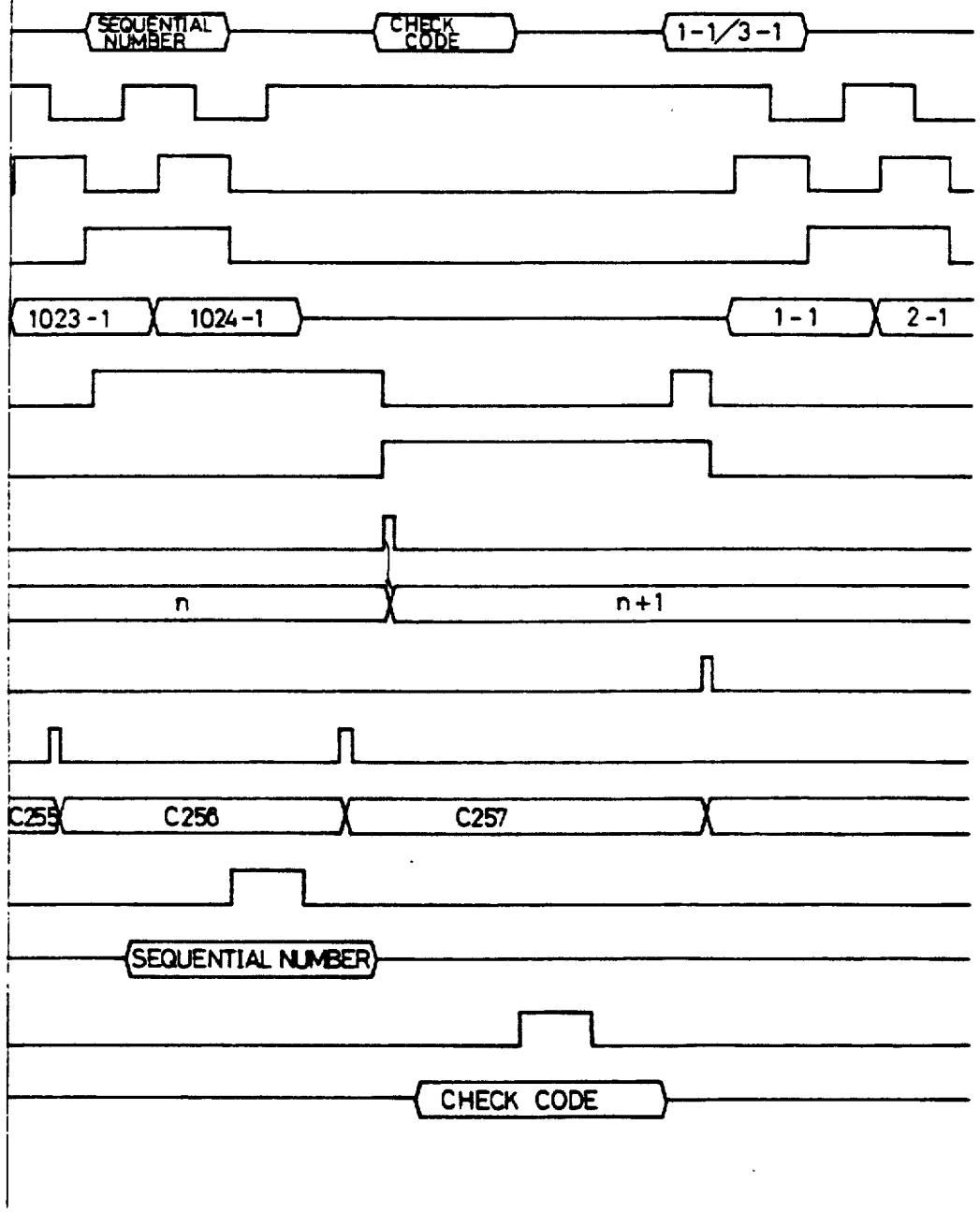

FIG. 4 shows a timing chart of various signals of buffer control unit 51 during the reading operation of data from data buffer 61. The description is given for data transfer from data transfer circuit 4 to main control unit 3. First, the main control unit 3 outputs an access command (not shown) for requested data into the disk control units, and sets a sequential number for said data through bus 200. The data transfer circuit 4 operates after reading 2-byte data "210" from data buffer 61 and when the pass signal from the main control unit 3 has logic "0" to output data "111" of byte 1—1 in response to request signal 330 and to return response signal 340. In response to next request signal 330 from the main control unit 4, data "111" of byte 3-1 is output and thereafter next two bytes of data "210" are read from buffer 61. When both of the sequential processing signal 370 and the check code processing signal 380 from the sector counter 9 have logic "0", the data read from data buffer 61 is transferred to the main control unit 3 in response to the request signal. Unless the sequential processing signal 370 and check code processing signal 380 have logic "0", the data read from the data buffer 61 (sequential number and check code) are not transferred to the main control unit 3. At this time, the sequential counter 5, check code generating circuit 6 and sector counter 9 operate concurrently with the writing of data.

Description is given for comparing operation of the sequential number comparing circuit 7. When sequential processing signal 370 output from sector counter 9 has logic "1" and check code processing signal 380 has logic "1" so that sequential number 260 read from data buffer 61 is fed to sequential number comparing circuit 7, the data transfer circuit 4 outputs sequential comparison signal 410 to the sequential number comparing circuit 7. The sequential number comparing circuit 7 operates when the sequential comparison signal 410 is output from data transfer circuit 4 to effect comparison of the sequential number 270 output from sequential counter 5 and the sequential number 260 read and output from data buffer 61 by means of data transfer circuit 4 with each other. If they are not coincident, sequential number non-coincident signal 280 is fed to the status register 10 and stored therein.

The description is given for comparing operation of the check code comparing circuit 8. Normally, the check code comparing circuit 8 carries out logically exclusive addition of check code 300 generated by check code generating circuit 6 and check code 290 read from data buffer 61 by means of data transfer circuit 4 with each other. If the result is zero, the coincidence is indicated. On the other hand, if the result of logically exclusive addition is not zero, non-coincidence is indicated. When sequential processing signal 370 output from sector counter 9 is logically "0" and check code processing signal 380 is logically "1" so that check code 290 of two bytes read from data buffer 61 is output, the data transfer circuit 4 outputs check code comparison signal 420 into check code comparing circuit 8. The check code comparing circuit 8 operates when check code comparison signal 420 is output from data transfer circuit 4 to compare check code 300 generated by check code generating circuit 6 with check code 290 read from data buffer 61 by data transfer circuit 4. If they are not coincident to each other, check code non-coincident signal 310 is applied to status register 10 and stored therein.

The main control unit 3 operates after the completion of data transfer to read out the content of status register 10 through bus 200. When non-coincidence of sequential number or check code, error information is passed to the host processor 1.

As described above, according to the invention, the data is applied with sequential number and check code, and written into disk devices. The data is read out of the disk devices by disk control means. When transferring the data stored in data buffer to the host processor, the sequential number and check code are subjected to comparison process so as to prevent errorneous reading of data of sector.

What is claimed is:

1. A disk control apparatus for reading and writing parallel data between a host processor and n number of disk devices using n number of disk control units respectively corresponding to each of said n number of disk devices, said disk control apparatus comprising:
   dividing means for dividing data from said host processor into n number of recording data,
   data transfer means for applying a sequential number to each of said n number of recording data and transferring each of said recording data and said sequential number to one of said disk control units in order to record said recording data and said sequential number in one of said disk devices corresponding to said disk control unit,
   sequential number comparing means for comparing n number of recorded sequential numbers of recorded data transferred from said disk control units with an applied sequential number applied when said data was recorded into said disk devices, and transmitting the result of the comparison to said host processor, and
   means for combining n number of said recorded data and transferring the combined data to said host processor.

2. A disk control apparatus for reading and writing parallel data between a host processor and n number of disk devices using n number of disk control units provided respectively corresponding to each of said disk devices, said disk control apparatus comprising:
   n number of data buffers provided corresponding to said disk control units, each of said data buffers storing data to be recorded in a corresponding one of said disk devices, outputting said data to a corresponding one of said disk control units, and receiving data read from said corresponding one of said disk devices associated with said corresponding one of said disk control units and storing said data,
   main control means for receiving data from said host processor, generating partition data which is produced by dividing said data into n number of partitions and outputting said partition data together with a sequential number determined corresponding to said partition data, and for, at the time of reading said data from said disk devices, outputting an applied sequential number, and transferring n number of generated partition data to said host processor,
   n number of sequential counters storing said sequential number output from said main control means,
   n number of data transfer circuits for, at the time of recording, storing generated partition data from said main control means and a sequential number output transferred from said sequential counter in a corresponding data buffer as recording data, and for, at the time of reading, dividing recorded data stored in said data buffer into said generated partition data and outputting both said divided partition data to be supplied to said main control means and said sequential number, and
   n number of sequential number comparing circuits for comparing said sequential number output from said data transfer circuit with said sequential number from said sequential counter, and outputting a result of the comparison to said main control means.

3. A disk control apparatus according to claim 2 further comprising n number of sector counters for counting the number of signals transferred with said data transfer circuit and for outputting an increment signal having said sequential number increased to said sequential counters when said number of signals counted reaches a fixed number.

* * * * *